United States Patent Office 3,146,381
Patented Aug. 25, 1964

3,146,381
MAGNETIC FORCE CONTROL OR SWITCHING SYSTEM
Louis Moreau, La Tronche, France, assignor to Societe de Vente d'Aimants Allevard-Ugine, Grenoble, Isere, France, a corporation of France
Filed June 8, 1961, Ser. No. 115,733
Claims priority, application France Sept. 12, 1960
6 Claims. (Cl. 317—171)

This invention relates to means for controlling magnetic flux in any system in which magnetic flux may be used for creating a magnetic force field for physical or mechanical applications.

In may fields of engineering systems are used which involve the production of magnetic force fileds and wherein it is necessary or desirable to switch the field on and off, or switch the field alternately between two or more separate portions of the system. This is the case especially in systems wherein the magnetic force is utilized to produce some mechanical action, as for example in magnetic lifting apparatus, magnetic tables and chucks as used in machine-tools and the like, magnetic clutches, couplings and brakes, magnetic latches, and many other analogous devices. Similar requirements may of course also arise in electrical and other physical apparatus using magnetic fields, as in power generators and motors, relays and solenoids, particle accelerators and other apparatus.

While a magnetic field can be turned on and off when using an electromagnet by simply energizing and deenergizing the electromagnetic fields windings, in many applications, especially of a mechanical order, the use of permanent magnets is preferred to that of electromagnets. Moreover, even in the case of electromagnets the energization and deenergization of the field windings is not an efficient method of field control because of the extremely large currents involved in such switching actions in the case of electromagnets of moderate to high power.

Among the means heretofore available for performing such magnetic force switching functions especially in respect to permanent magnets some have included the provision of a movable armature portion associated in a magnetic circuit with the power magnet and movable between a circuit-closing and a circuit-opening position for switching the force field off and on in a desired region adjacent the magnet. However, the provision of mechanically displaceable parts is a complication which is obviously undesirable and sometimes prohibitive in many applications. Other means have employed electric current windings associated with the permanent magnet for selectively magnetizing it in one or opposite sense and/or demagnetizing the magnet. For example, two permanent magnets may be used to act in parallel on a common armature and provided with magnetizing windings. When the windings are energized to magnetize both magnets in the same direction a resultant field is created and the armature may be attracted, while with the windings energized to magnetize the magnets in opposite senses the magnetic flux can be made to flow through a closed inner magnetic circuit and the armature is released. However, the control of permanent magnets by means of magnetizing and demagnetizing currents is highly inefficient and requires the use of large current intensities for effectively saturating permanent magnet alloys in view of their large values of coercive force.

It is therefore an object of this invention to fill the heretofore unsatisfied demand for a simple, convenient and efficient means of controlling and especially switching a magnetic field. An object is to provide a magnetic force control or switching system using no moving parts and requiring the use of much lower currents than would be formerly required to handle magnetic fields of similar strength. Other objects are to provide improved apparatus or mechanisms using a magnetic field in their operation to develop attractive or similar effects, and provided with novel magnetic field switching means for a simple, convenient and positive control of said apparatus.

The invention in one important aspect is for a magnetic force control system comprising power magnet means generating a main magnetomotive force, means defining at least two magnetic circuit paths in parallel and both including said power magnet means, and an auxiliary magnet means included in at least one of said circuit paths and generating a controllable auxiliary magnetomotive force producing a control flux through said one path whereby to control the distribution of the flux produced by said main magnetomotive force between said magnetic circuit paths.

The invention in a more specific one of its aspects is for a magnetic force switching system comprising a power magnet, means defining at least two magnetic circuit paths in parallel both including said power magnet, and a control electromagnet included in at least one of said paths and electrically energizable to switch the flux generated by said power magnet selectively between the magnetic circuit paths.

Further aspects and features of the invention will appear as the disclosure proceeds with reference to the accompanying schematic drawings wherein.

Figure 1:
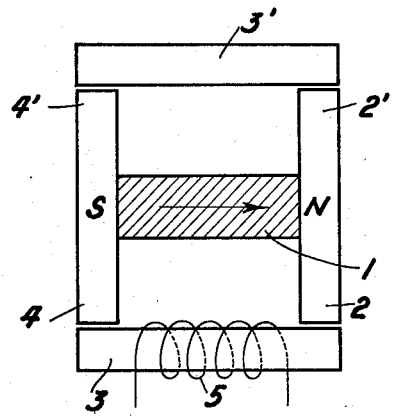
FIG. 1 illustrates a magnetic force control system serving to explain the principles of the invention.

The principles on which the invention is based may best be understood by visualizing the following experiment performed with a basic system according to the invention schematically shown in FIG. 1. This system comprises a main magnetomotive force generator or power magnet 1, which may be either an electromagnet or a permanent magnet, e.g., the permanent bar magnet shown. Across the north and south poles of magnet 1 and in magnetically connected relation with them are provided two bars of magnetic material, one bar having two arms 2 and 2' projecting to either side from the north pole of magnet 1 and the other bar having the two bars 4 and 4' projecting to either side from the south pole of magnet 1. The system further includes a pair of magnetic armatures 3 and 3', armature 3 being selectively movable into and out of magnetic engagement with the ends of arms 2 and 4, and armature 3' similarly movable into and out of magnetic engagement with the ends of arms 2' and 4'. It will be understood that the expressions magnetic engagement or magnetic connection as here used do not preclude the possibility of a gap being present between the magnetically engaging or connected elements. It will be seen that the system of FIG. 1 thus provides a pair of parallel magnetic circuit paths each including the power magnet 1 as a magnetomotive force-generating portion in it, one of the circuit paths being traced as 1–2–3–4–1, and the other as 1–2'–3'–4'–1.

Now assume that armature 3 is brought into engagement with arms 2 and 4, in the position shown while armature 3' is positioned somewhere out of engagement with arms 2' and 4'; in other words assume circuit 1–2–3–4–1 is closed while the other circuit remains open. Flux passes through armature 3 and the armature is magnetically attracted. If now the other armature 3' is moved to the circuit-closing position shown, no flux will traverse it nor will said armature 3' be attracted since all of the available flux is passing through the first closed circuit. However, asuming that an electromagnetic winding 5 has been provided say around armature 3, then 't is found that if a current pulse of the proper polarity and sufficient magnitude is applied to the winding the flux can be switched from the lower to the upper circuit path, so that armature 3' will now be attracted while armature 3 is released. If thereafter a current pulse of the opposite polarity is applied to the winding, the flux is switched back to its original path. This alternate switching of the flux between the two parallel circuit paths can be effected as many times as desired.

It is important to understand that in the above experiment the current pulse applied to the control winding such as 5 associated with one of the parallel circuits is considerably less than the current that would be required to demagnetize or reverse the magnetization of the permanent power magnet bar 1, or the current that would be required to energize and deenergize (or reverse the magnetization of) an electromagnet used as the power magnet 1, to provide a similar magnetic field. The action of the control winding 5 is analogous to a switching or valving action, in that the power required to operate the valve or switch is of the order of magnitude less than the power that is switched or valved between the two circuit portions.

Figure 2:
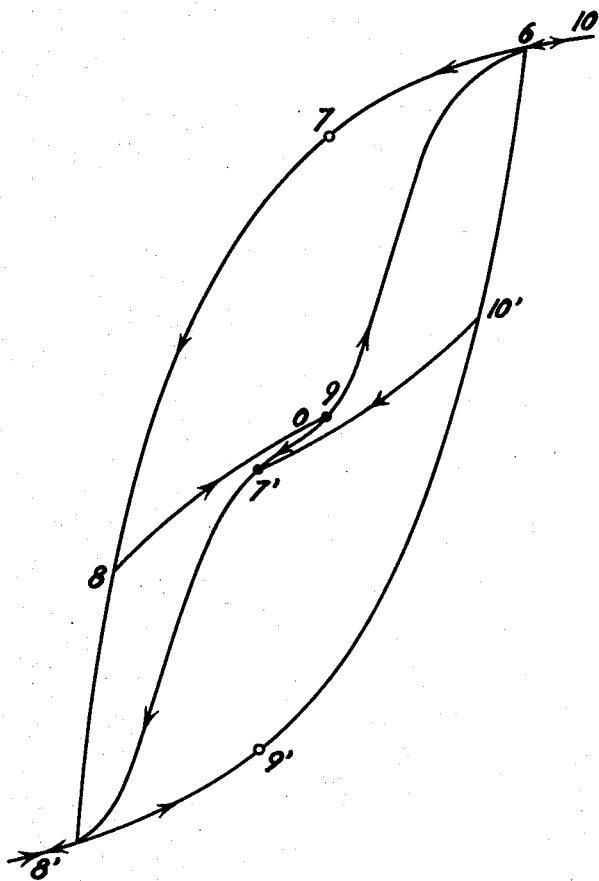
FIG. 2 is a hysteresis graph used in explaining the operation of the system of FIG. 1.

A closer insight into the phenomena responsible for the above described effects can be gained by a consideration of the hysteresis graph shown in FIG. 2. This graph assumes for simplicity that all of the magnetic materials making up the circuits 2–3–4 and 2'–3'–4' are the same. The unprimed and the primed numerals such as 7 and 7' designate the operating points of the magnetic materials of circuits 2–3–4 and 2'–3'–4' respectively, which for clarity have been shown positioned on opposite segments (the first and third quadrants respectively) of the hysteresis loop. Assuming as in the above described experiment that armature 3 is first moved to its engaging position (and that the initial condition is zero magnetization), then the operating point of circuit 2–3–4 describes the curve segment 0–6 from its demagnetized condition to a condition approaching saturation. When thereafter the armature 3' (FIGURE 1) in turn is moved to its engaged position, the operating point of the material in circuit 2'–3'–4' starts in turn to describe its initial magnetization curve from point 0 to point 7', while the material in the saturated circuit 2–3–4 describes the curve segment 6–7 over the desaturating portion of its curve. Thus it is clearly seen that the magnetic flux is unequally distributed between the two circuits, since the first-saturated circuit remains in a condition close to saturation while the operating point of the other circuit travels only a short distance over its initial magnetization curve.

On applying the current pulse to control winding 5, the operating points of the respective circuits move from 7 and 7' to 8 and 8' respectively. That is, application of an auxiliary magnetomotive force in the form of a pulse of electromagnetic energy has modified the magnetic state of the material in its respective circuits so that the previously saturated (upper) circuit now approaches desaturation while the previously unsaturated circuit is brought to a condition approaching saturation.

On cessation of the current pulse in winding 5 the respective operating points move from 8 to 9 and from 8' to 9' respectively, with the two circuits substantially retaining their respective unsaturated and saturated conditions. The upper circuit is now practically completely desaturated while the lower circuit is still practically saturated. If a further pulse of opposite polarity is now applied, the respective operating points are moved from 9 to 10 and from 9' to 10'; and on cessation of this further pulse the operating points return substantially to the points 7 and 7' at which the cycle was begun.

In sum the application of successive pulses of alternating polarity to the control winding 5 causes the operating point for circuit 2–3–4 to describe a cycle such as 9–6–7–8–9, and the operating point for circuit 2'–3'–4' to describe a cycle such as 10'–7'–8'–9'–10', both cycles being substantially identical but being described in reverse directions, whereby the desired alternate energization of the respective circuit paths can be accomplished. It will be understood that the actual positions of the various operating points in each of the circuit conditions will depend on the composition of the materials used, the geometry of the circuits, and the characteristics of the current pulse applied, which factors can easily be chosen by calculation and/or experiment to provide the most efficient operating conditions, i.e., sharp and clearcut switching of flux between the two parallel circuit paths.

Thus it is apparent that the magnetic system diagrammatically illustrated in FIG. 1 constitutes, in effect, a magnetic force switching device, whereby the magnetic force can be selectively switched between two portions of the system so as to attract either the armature 3 or the armature 3' as desired. The system may also be regarded as an on-off magnetic switch whereby the force exerted on one of the armatures, say armature 3', can be selectively turned on and off by the application of successive pulses to a control winding associated with the circuit portion including the other armature 3. It is stressed once again that the current pulses applied to the control winding are considerably lower in magnitude that what would be required to affect the magnetism of the main magnetomotive force means, or power magnet, 1. This is in direct contrast to those prior art systems in which current pulses have been used to magnetize and demagnetize, or reverse the magnetization of, a permanent magnet.

The invention thus makes it possible to control the distribution of the magnetic flux generated by the main or power magnet, as between the parallel magnetic circuit paths. While in most cases the desired control action will assume the form of the clearcut switching action more specifically described hereinabove, i.e., with the circuit portions alternating betweeen a substantially fully saturated and substantially desaturated condition as described with reference to FIG. 2, this is by no means essential. In certain applications of the invention it may well be desired to control the magnetic flux between discrete predetermined values other than near-zero and near-saturation. As explained with reference to FIG. 2 the desired distribution can be predetermined by a suitable choice of the various parameters that determine the positions of the operating points on the hysteresis graph in the various conditions of the system.

It should be observed that the application of a current pulse to a control winding 5, basically considered, constitutes a means of introducing an auxiliary magnetomotive force into one of the parallel circuit paths. That is, the armature 3 and its associated winding 5 act as an auxiliary magnetomotive force generating means, i.e., an auxiliary magnet, temporarily introduced into this circuit path. While such a control pulse winding associated with a suitable portion of the magnetic circuit path constitutes an especially convenient and preferred means of performing this function it is not the only means of doing so, and the invention may contemplate introducing the auxiliary magnetomotive force into one of the parallel circuit paths by means other than electric control pulsing. An equivalent result may be achieved by providing a displaceable auxiliary permanent magnet (or displaceable electromagnet); the resulting system would differ radically from any of the conventional systems using displaceable armatures, in that the latter are magnetically passive elements that do not introduce a magnetomotive force into a portion of the magnetic circuit, as is required by the basic principle of the present invention. As another alternative, the requisite auxiliary or control magnetomotive force may be introduced and removed by acting on a physical characteristic of an auxiliary permanent magnet interposed in fixed position in one of the parallel circuit paths. This may be done for example by controlling the temperature of the auxiliary magnet with respect to the Curie point, or by other suitable means.

Where the means for controlling the auxiliary magnetomotive force is an electric means, the electric control current may be applied in various forms: as pulses or signals of varying duration and of any desired waveform, as permanent, D.-C. or A.-C. currents, and the like.

The number of separate magnetic circuit paths provided in parallel with the main magnetic generator may be greater than the two heretofore considered. The auxiliary magnetic generator producing the auxiliary or control magnetomotive force may be provided in only one, or more, of the parallel paths. Desirably, the control magnetomotive force introduced by the auxiliary generator is approximately equal, as an order of magnitude, to the force necessary to generate in each of said paths a magnetic flux equal to the flux generated by the main generator when the latter is removed. It will be understood that this result can be obtained while still requiring the application, to the auxiliary flux generator assumed to be provided by an electromagnetic control winding such as 5 associated with a part of the magnetic circuit, of a considerably lower current, in terms of ampere-turns, than would be required to magnetize or demagnetize the main or power magnet 1. For this purpose, the parallel magnetic circuits may desirably be made from a relatively "hard" magnetic alloy, though less hard than the alloy from which the main flux generator or power magnet is made, so that considerably less ampere-turns in the control winding will be required to circulate said flux through the parallel circuits than what would be required to magnetize and demagnetize the power magnet. The power magnet, if a permanent magnet, may be made from an alloy or material having a high coercive force, i.e., a "hard" allow, such as a suitable ferrite, the alloy sold as Ticonal, or the like. It is preferably magnetized to saturation so as to deliver a stable, practically constant high flux throughout the operation of the system.

A device basically similar to the one diagrammatically shown in FIG. 1 has been constructed and operated to switch the magnetic force applied to the respective armatures 3 and 3' between a high and a low value alternately. In one of the two conditions of the system the attractive force on one armature was 56 kilograms and that on the other armature was 2 kg., and in the other switched condition of the system these values were reversed. The control pulses applied to the winding 5 to bring about this switching action were 250 ampere-turns. The system has been switched between its two conditions a very great number of times without showing any perceptible variation in the magnetic forces developed.

In applications where it is desired simply to switch the magnetic force applied say to armature 3' on and off, rather than switching the force back and forth between the two armatures, the control pulses applied to winding 5 may desirably be alternating-current.

While the control winding 5 has been shown as mounted around the armature 3, it will be evident that the winding might be associated with any other part of either of the parallel circuits, e.g., with an arm such as 2, 4, 2' or 4'.

While both parallel circuit paths shown in FIG. 1 have been presented as identical, this is by no means necessary, as will be illustrated on another embodiment to be described with reference to FIG. 4. One or more airgaps may be provided at suitable points of one or more of the parallel circuits if desired.

Figure 3:
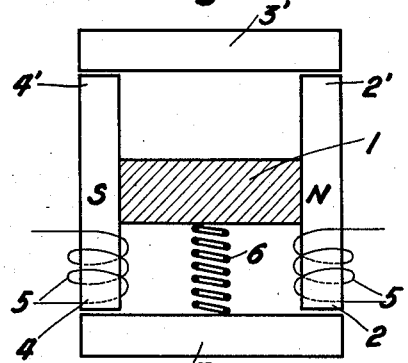
FIG. 3 illustrates an embodiment of the invention as applied to a magnetic latch mechanism.

FIG. 3 illustrates an embodiment of the invention generally similar to that shown in FIG. 1 but applied to a magnetic latch device. In this case armature 3' is provided stationary and small airgaps are desirably provided between it and the arm portions 2' and 4', the arrangement being in any case such that the reluctance of the circuit 2'-3'-4' of which said armature 3' forms part will have a relatively high value as compared to the reluctance of the other parallel circuit 2-3-4 when the latter is in closed condition. The armature 3 may constitute a latch member being movable between an "open" position spaced away from the ends of arms 2, and the "closed" position shown. A light spring 6 may urge the latch member 3 to its open position. The control winding 5 is here shown in two sections surrounding the arms 2 and 4. To release the latching device, i.e., temporarily switch off the magnetic attracting force holding armature 3 in its closed position, a pulse of current is applied to winding 5, of suitable polarity and sufficient intensity to switch the flux from circuit 2-3-4 to circuit 2'-3'-4', overcoming the added reluctance of this circuit due, e.g., to the provision of airgaps. An A.-C. pulse may also here be used. The light spring 6 serves simply to displace the armature positively to its open position at the time the magnetic force applied to it is a minimum.

Figure 4:
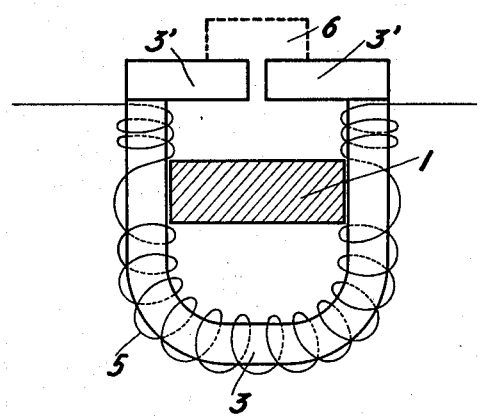
FIG. 4 illustrates another exemplary embodiment of the invention as applied to a magnetic table device.

FIG. 4 illustrates an embodiment of the invention applied to a magnetic table, and serves to clamp or release a steel part 6 on the flat upper surface of the armature 3', shown in two parts with a gap between them. The lower circuit is in this case provided by an integral U-shaped member 3 surrounding the power magnet 1 between its arms. A control winding 5 is wound around the major length of the member 3. The member 3 is made from a permanent magnet alloy and is so proportioned that all of the flux created by power magnet or main magnetomotive force generator 1 can traverse it. On application of a current to winding 5, the member 3 acts as an auxiliary magnet or M.M.F. generator in series with the main generator 1. If at this time a steel part 6 is placed as shown, it is practically unattracted even though the reluctance of the magnetic circuit branch 1-3'-6 is low, since there is no magnetomotive force available for circulating flux through this branch circuit. However, if a current pulse of opposite polarity is applied to winding 5, the member 3 is magnetized in reverse to generate an auxiliary flux reverse from the flux generated by power magnet 1. There is now made available across the poles of magnet 1 a high magnetomotive force capable of generating a stable flux through the part 6 and clamping it in position. A fresh current pulse applied in the first-mentioned polarity will again release the part 6.

It will be understood that a great many modifications may be made in the construction of the invention and in the applications thereof aside from the specific constructions and applications shown and described. Thus, more complex systems including more than one main magnetic generator or power magnet may readily be devised. The parallel magnetic circuit branches or paths may assume a variety of forms, similar to or differing from one another. While it is preferred, as stated earlier, that the auxiliary magnetomotive force created in a branch circuit shall not substantially react upon the main generator to affect the magnetization of it, in some applications some degree of influence of the auxiliary on the main M.M.F. generator may be tolerable. The invention will find a great variety of applications in various types of mechanical apparatus utilizing magnetic forces, and for the control and switching of magnetic fields in general.

What I claim is:

1. A magnetic force switching device comprising a power magnet means; two means magnetically engaging respective poles of said power magnet means intermediate their ends, said two means being composed of a ferromagnetic material having a coerciveness higher than that of soft iron; two magnetic armatures magnetically engageable with corresponding ends of said two means and displaceable into and out of their position of engagement to define a pair of parallel magnetic circuit paths, each path including said power magnet means; and winding means associated with at least one of said circuit paths and electrically energizeable by pulses, whereby a pulse in one direction establishes a given flux configuration in said pair of magnetic circuits, and a pulse in the opposite direction produces a different given flux configuration in said pair of circuits, each flux configuration remaining substantially stable until the next opposite pulse.

2. The switching device of claim 1, in which in one of said flux configurations at least the major part of the flux passes through one of said two armatures, and in the other configuration at least the major part of the flux passes through the other of said two armatures.

3. A magnetic force switching device, comprising power magnet means; a plurality of first magnetic means having intermediate points magnetically engaging the poles of said power magnet means and including spaced arms projecting beyond said poles, said magnetic means being composed of a ferromagnetic material having a coerciveness higher than that of soft iron; second magnetic means interconnecting said spaced arms on one side of said power magnet means to complete a first magnetic circuit path including the power magnet means; a magnetic armature magnetically engageable with the ends of said arms on the other side of said power magnet means and movable into and out of magnetic engagement, whereby to provide a second magnetic circuit path in parallel with said first path; and winding means associated with one of said paths and energizing with electrical pulses, whereby a pulse in one direction switches the flux of said power magnet means from said first path to said second path, and a pulse in the opposite direction switches said flux from said second path to said first path, the flux path in each case being substantially stable until the next pulse in the opposite direction, whereby said armature is alternatively held and released.

4. The device of claim 3, wherein said first path has a substantially higher reluctance than the reluctance of said second path in the held position of said armature.

5. The device of claim 3, including resilient means urging said armature away from the held position.

6. A magnetic table, comprising a power magnet means; magnetic means in magnetic connection with said power magnet means for producing a continuous path for all of the flux of said power magnet means, said magnetic means being composed of a permanent magnet alloy and having two spaced arms extending in one direction beyond said power magnet means; first means including a gap for magnetically bridging the space between said arms and for supporting a magnetic material across said gap; and a winding for receiving electrical pulses associated with said magnetic means, whereby a momentary magnetic field generated in one direction by said winding aiding the field of said power magnet means and in the opposite direction opposing said field of said power magnet means causes the flux to switch back and forth stably and permanently until the next opposite pulse between the circuit defined by said power magnet means and said magnetic means and the circuit defined by said power magnet means, said first means, and said means supported thereby.

References Cited in the file of this patent
UNITED STATES PATENTS

| | | |
|---|---|---|
| 2,888,290 | Pierce | May 26, 1959 |
| 2,924,758 | Weber | Feb. 9, 1960 |
| 2,928,029 | Norton | Mar. 8, 1960 |
| 3,089,064 | De Bennotot | May 7, 1963 |